US 6,697,958 B1

(12) United States Patent
Yada et al.

(10) Patent No.: US 6,697,958 B1
(45) Date of Patent: Feb. 24, 2004

(54) METHOD AND APPARATUS FOR DRIVING A RECORDING MEDIUM, METHOD AND SYSTEM FOR RECORDING AND REPRODUCING INFORMATION, AND INFORMATION SUPPLYING MEDIUM

(75) Inventors: Hiroaki Yada, Kanagawa (JP); Hiroshi Kanno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/471,789

(22) Filed: Dec. 23, 1999

(30) Foreign Application Priority Data

Dec. 25, 1998 (JP) ............................................. 10-369412

(51) Int. Cl.[7] ............................................... G06F 11/00
(52) U.S. Cl. .................................. 714/6; 714/5; 714/47
(58) Field of Search .................... 714/5, 6, 47; 711/112

(56) References Cited

U.S. PATENT DOCUMENTS

| 5,388,254 A | * | 2/1995 | Betz et al. ..................... 714/16 |
| 5,544,339 A | * | 8/1996 | Baba .......................... 711/114 |
| 5,634,037 A | * | 5/1997 | Sasaki et al. ................. 711/152 |
| 5,721,816 A | * | 2/1998 | Kusbel et al. .................. 360/53 |
| 5,812,752 A | * | 9/1998 | Yamada .......................... 714/5 |
| 5,872,905 A | * | 2/1999 | Ono et al. .................... 711/100 |
| 6,125,459 A | * | 9/2000 | Andoh et al. ................. 711/161 |
| 2002/0010833 A1 | * | 1/2002 | Yoshihiro .................... 711/112 |

* cited by examiner

Primary Examiner—Robert Beausoliel
Assistant Examiner—Marc Duncan
(74) Attorney, Agent, or Firm—Frommer Lawrence & Haug LLP; William S. Frommer; Glenn F. Savit

(57) ABSTRACT

A disk drive for recording information on and reproducing information from a hard disk drive. The CPU of a host device controls the maximum allowable number of retries, or the maximum period of time allowed for retries, performed by the disk drive when an error occurs in a seek, record, or reproduce operation.

24 Claims, 18 Drawing Sheets

FIG. 8

| BYTE | 7 | 6 | 5 | 4 | 3 | 2 | 1 | 0 |
|---|---|---|---|---|---|---|---|---|
| 0 | MAXIMUM ALLOWABLE NUMBER OF READ RETRIES ||||||||
| 1 | MAXIMUM ALLOWABLE NUMBER OF WRITE RETRIES ||||||||
| 2 | MAXIMUM ALLOWABLE NUMBER OF SEEK RETRIES ||||||||
| 3 | ||||||||
| 4 | ||||||||
| 5 | ||||||||
| 6 - 511 | ||||||||

| REGISTER | 7 | 6 | 5 | 4 | 3 | 2 | 1 | 0 |
|---|---|---|---|---|---|---|---|---|
| FEATURES | MAXIMUM ALLOWABLE NUMBER OF READ RETRIES ||||||||
| SECTOR COUNT | NUMBER OF READ SECTORS ||||||||
| SECTOR NUMBER | READ START ADDRESS AT WHICH READING OF A LOGICAL BLOCK IS STARTED ||||||||
| CYLINDER LOW | ||||||||
| CYLINDER HIGH | ||||||||
| DEVICE / HEAD | ||||||||
| COMMAND | 86h ||||||||

FIG. 14

| REGISTER | 7 | 6 | 5 | 4 | 3 | 2 | 1 | 0 |
|---|---|---|---|---|---|---|---|---|
| FEATURES | | MAXIMUM ALLOWABLE NUMBER OF READ RETRIES | | | | | | |
| SECTOR COUNT | NUMBER OF WRITE SECTORS | | | | | | | |
| SECTOR NUMBER | WRITE START ADDRESS AT WHICH WRITING OF A LOGICAL BLOCK IS STARTED | | | | | | | |
| CYLINDER LOW | | | | | | | | |
| CYLINDER HIGH | | | | | | | | |
| DEVICE / HEAD | | | | | | | | |
| COMMAND | 87h | | | | | | | |

FIG. 16

| REGISTER | 7 | 6 | 5 | 4 | 3 | 2 | 1 | 0 |
|---|---|---|---|---|---|---|---|---|
| FEATURES | MAXIMUM ALLOWABLE NUMBER OF WRITE RETRIES | | | | MAXIMUM ALLOWABLE NUMBER OF SEEK RETRIES | | | |
| SECTOR COUNT | NUMBER OF WRITE SECTORS | | | | | | | |
| SECTOR NUMBER | WRITE START ADDRESS AT WHICH WRITING OF A LOGICAL BLOCK IS STARTED | | | | | | | |
| CYLINDER LOW | | | | | | | | |
| CYLINDER HIGH | | | | | | | | |
| DEVICE / HEAD | | | | | | | | |
| COMMAND | 89h | | | | | | | |

125

100 FEATURES
101 SECTOR COUNT
102 SECTOR NUMBER
103 CYLINDER LOW
104 CYLINDER HIGH
105 DEVICE / HEAD
106 COMMAND

FIG. 18

| BYTE | 7 | 6 | 5 | 4 | 3 | 2 | 1 | 0 |
|---|---|---|---|---|---|---|---|---|
| 0 | \multicolumn{8}{c}{DELAY INFORMATION} | | | | | | | |
| 1 | | | | | | | | |
| 2 | | | | | | | | |
| 3 | | | | | | | | |
| 4 | | | | | | | | |
| 5 | | | | | | | | |
| 6 - 511 | | | | | | | | |

127

METHOD AND APPARATUS FOR DRIVING A RECORDING MEDIUM, METHOD AND SYSTEM FOR RECORDING AND REPRODUCING INFORMATION, AND INFORMATION SUPPLYING MEDIUM

BACKGROUND OF THE INVENTION

1. Field of the Invention

The present invention relates to a technique for driving a recording medium; such as continuous real-time data such as moving image data; and the medium itself.

2. Description of the Related Art

Hard disk drives (HDDs) are widely used as magnetic disk devices. With advancements in magnetic head technology and signal processing technology, the surface storage density has increased an average of about 60% per year since 1990. It is expected that a single disk with a diameter of 3.5 inches will have a storage capacity of 10 to 20 GB by the year 2000 or soon thereafter and thus a single HDD including a plurality of disks will have a storage capacity of 100 GB or more. Such an increase in storage capacity in conjunction with high efficiency digital moving picture compression technology such as DV (Digital Video) technology (transmission rate=29 Mbps) or MPEG-2 (Moving Picture Experts Group phase-2) technology (transmission rate=15 Mbps) will make it possible to concurrently record or reproduce plural channels of moving image information on an HDD. That is, a practical multi-channel moving image disk recorder will be provided.

Historically, the HDD has been developed as a primary storage device for use in a computer, and thus the technology of the HDD has been developed so as to randomly access discrete text data in a highly reliable fashion as quickly as possible. This means that operations are performed discretely with respect to time. That is, commands such as a record command or a reproduce command supplied from a host device to the HDD are separately and discretely executed one by one. In order to assure that a recording or reproducing operation is completed within a predetermined period of time (that is, in order to assure real-time operation), the HDD must be designed such that it completes its recording or reproducing processing within the predetermined period of time.

One factor which can prevent the assurance of real-time operation is a retry of a data recording/reproducing operation, that is, the same operation is re-executed if an error is detected. Typically, the recording/reproducing of data is performed in units of small data sectors (each data sector consists of, for example, 512 bytes) corresponding to the packets that are used in communication technology. When the HDD head is moved to a track for recording or reproducing, but that track cannot be found (that is, if a seek error occurs), the moving of the head to that data sector is retried (a seek retry is performed). This is because if a seek error occurs, data cannot be recorded or reproduced correctly for all of the data sectors of interest and, thus, a seek error can cause a large burst error which cannot be corrected by means of an error correction code (ECC). Hence, it is desirable to perform a seek retry. However, each seek retry needs several to several tens of msec, and thus it becomes impossible to assure real-time operation.

If, during a data recording operation, the position of the head deviates from a data track because of mechanical shock or the like, due to external influences, from the outside, the data recording operation is retried (that is, a write retry is performed) after the head has returned to the correct position on the track and the sector of interest once again rotates into position for the recording operation. Therefore, if a write retry occurs, a break occurs in the otherwise continuous data recording operation, and a disk rotation waiting time (for example, 11 msec when the rotation speed is 90 Hz) is required. This too makes it difficult to assure real-time operation.

If a larger amount of errors occurs when data is reproduced from a data sector, and if it is determined that the amount of errors is too large to be corrected by ECC correction, the data reproducing operation is re-executed (that is, a read retry is performed) after the sector once again rotates into position to be read. Thus, a break occurs in the otherwise continuous data reproducing operation, and a disk rotation waiting time is required, thereby making it difficult to assure real-time operation. Furthermore, if an error which cannot be corrected occurs in a first read retry, a second read retry is executed; and if there are hard errors due to noise or other random factors, a large number of read retries can fail. For example, if ten or more successive read retries fail, 100 msec or more are needed for read retries until data is correctly read.

Usually, a maximum allowable number of retries for various operations is designed into the HDD. Retries are fully enabled or disabled according to, for example, the ATA (AT-Attachment) interface standard recommended by the ANSI (American National Standard Institute). However, if retries are fully enabled, the amount of non-useful write or read time increases and it becomes difficult to assure real-time operation. Conversely, if retries are fully disabled, a non-correctable burst error owing to a seek error may arise, and thus significant degradation occurs in the quality of the reproduced data.

Therefore, it is an object of the present invention to provide a technique of executing retries of various operations within a period of time which allows the HDD to continuously record and reproduce data, such as a moving image, in real time while maintaining the data quality and reliability of the HDD.

SUMMARY OF THE INVENTION

According to an aspect of the present invention, there is provided a technique for driving a recording medium in which it is the control signal that is output from the information processing apparatus with which the present invention is used that functions to control the re-execution of a read or write operation.

The information processing apparatus manages the delay time caused by the re-execution (or retry) which is performed when an error occurs in seeking, recording, or reproducing data; and generates the re-execution control signal in accordance with that delay time.

If an error occurs in a seeking, recording, or reproducing operation, the failed operation is re-executed in accordance with the re-execution control signal which, in turn, is related to the delay time caused by such re-execution.

BRIEF DESCRIPTION OF THE DRAWINGS

FIG. 8 illustrates the format of AV mode setting parameters;

FIG. 11 illustrates the format of an AV stream read command;

FIG. 14 illustrates the format of an AV stream write command;

FIG. 16 illustrates the format of an AV stream write command (specifying the maximum allowable number of seek retries);

FIG. 18 illustrates the format of retry status information;

DESCRIPTION OF THE PREFERRED EMBODIMENTS

Figure 1:
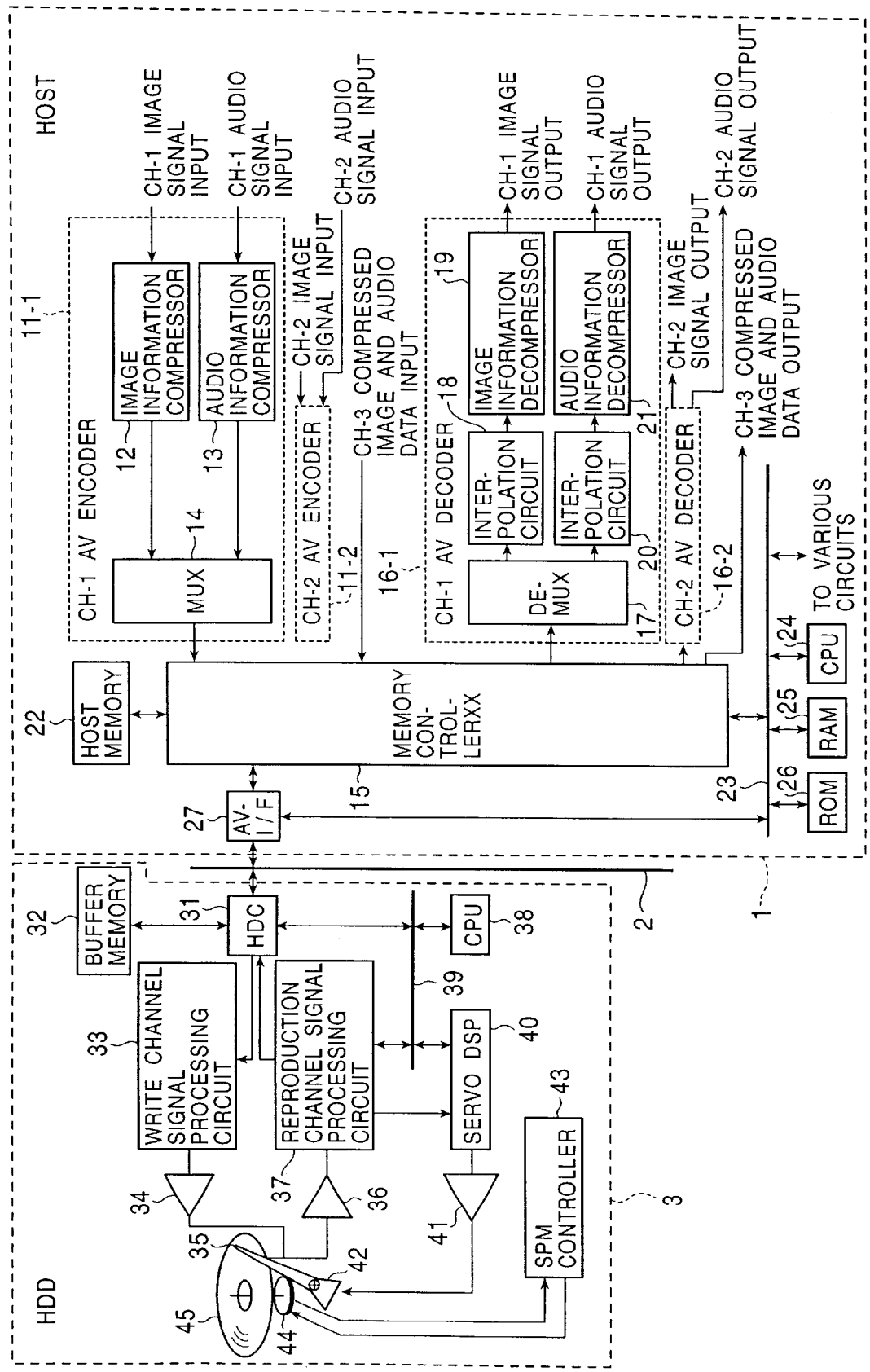
FIG. 1 is a block diagram illustrating the construction of a digital image disk recorder according to the present invention.

The present invention is described in further detail below with reference to preferred embodiments. In order to provide a clear understanding of the correspondence between means and specific elements employed in embodiments of the invention, specific examples of elements are described in parentheses following the corresponding means. However, it should be understood that the means are not limited to those specific examples.

The recording medium driving apparatus according to one aspect of the invention comprises: control signal receiving means (for example, an HDC 31 shown in FIG. 1) for receiving a control signal output from an information processing apparatus (for example, a host device 1 shown in FIG. 1) to control a re-execution operation; and re-execution control means (for example, a CPU 38 shown in FIG. 1) for controlling the re-execution in accordance with the control signal output from the information processing apparatus.

Preferably, the recording medium driving apparatus further comprises delay time data pawn transmission means (for example, step S51 described below in conjunction with FIG. 19) for transmitting data representing a delay time caused by the re-execution to the information processing apparatus.

The information processing apparatus according to an aspect of the invention comprises: management means (for example, step S21 described below in conjunction with FIG. 10) for managing the delay time caused by a re-execution which is performed when an error occurs in a seeking, recording, or reproducing operation of the recording medium driving apparatus; generation means (for example, step S22 of FIG. 10) for generating a control signal for controlling the re-execution performed by the recording medium driving apparatus in accordance with the delay time managed by the management means; and transmission means (for example, memory controller 15 shown in FIG. 1) for transmitting the control signal generated by the generation means to the recording medium driving apparatus.

The information recording and reproducing system according to an aspect of the invention comprises a recording medium driving apparatus and an information processing apparatus wherein the recording medium driving apparatus comprises: control signal receiving means (for example, the HDC 31 shown in FIG. 1) for receiving a control signal output from an information processing apparatus to control a re-execution; and re-execution control means (for example, the CPU 38 shown in FIG. 1) for controlling the re-execution in accordance with the control signal output from the information processing apparatus, and wherein the information processing apparatus comprises: management means (for example, step S21 of FIG. 10) for managing the delay time caused by a re-execution which is performed when an error occurs in a seeking, recording, or reproducing operation of the recording medium driving apparatus; generation means (for example, step S22 of FIG. 10) for generating a control signal for controlling the re-execution performed by the recording medium driving apparatus in accordance with the delay time managed by the management means; and transmission means (for example, the memory controller 15 shown in FIG. 1) for transmitting the control signal generated by the generation means to the recording medium driving apparatus.

An embodiment of an information recording and reproducing system according to the present invention is now described. In the following description, a fixed hard disk drive is employed as a typical example.

FIG. 1 illustrates an example of the construction of a digital image disk recorder which is an example of the recording and reproducing system according to the invention. A hard disk drive (HDD) 3 is connected to a host device 1 via a host interface bus 2. The host device 1 includes an AV (audio visual) encoder 11-1 for a first channel (CH-1). The AV encoder 11-1 includes an image information compressor 12 for compressing (encoding) an input image signal in accordance with, for example, the MPEG standard, an audio information compressor 13 for compressing (encoding) an audio signal corresponding to the image signal in accordance with the MPEG standard, and a multiplexer (MUX) 14 for multiplexing the output of the image information compressor 12 and the output of the audio information compressor 13. There is also provided an AV encoder 11-2 for a second channel (CH-2) similar to the AV encoder 11-1 for the first channel. Although not shown in the figures, the AV encoder 11-2 also includes an image information compressor for compressing an image signal of the second channel, an audio information compressor for compressing an audio signal of the second channel, and a multiplexer for multiplexing the compressed image and audio signals.

A signal output from the AV encoder 11-1 or the AV encoder 11-2 is input to a memory controller 15. The memory controller 15 also receives, via third channel, compressed image and audio data compressed by an encoder (not shown).

The memory controller 15 is connected to a host memory 22 for storing at least one cluster of data which is reproduced from or is to be recorded onto a magnetic disk 45 (hereinafter referred to simply as a disk 45) of the HDD 3 wherein reproducing and recording of data from or onto the disk 45 is performed in units of clusters. The memory controller 15 transfers to the host memory 22 compressed image and audio data received from the AV encoder 11-1 or 11-2, or image and audio data which is input in an already-compressed form from the third channel, for storage. The data stored in the host memory 22 is then transferred to the HDD 3 via an AV interface 27 and the host interface bus 2. When the memory controller 15 receives reproduced data from the HDD 3 via the host interface bus 2 and the AV interface 27, the memory controller 15 temporarily stores the reproduced data in the host memory 22 and then reads it as required. The data read from the host memory 22 is output to the AV decoder 16-1 or 16-2, or directly to a device which is not shown in FIG. 1.

The AV decoder 16-1 of the first channel includes a demultiplexer (DEMUX) 17 for separating image data and audio data from compressed image and audio data input from the memory controller 15 and outputting them to an interpolation circuit 18 and an interpolation circuit 20, respectively. The interpolation circuit 18 corrects an error of the compressed image data input from the demultiplexer 17 by means of interpolation and outputs the resultant data to an image information decompressor 19. The image information decompressor 19 performs decompression which is the reverse of the compression performed by the image information compressor 12. The resultant decompressed image signal is output to a device not shown in FIG. 1. The interpolation circuit 20 corrects an error of the compressed audio data input from the demultiplexer 17 by means of interpolation and outputs the resultant data to an audio information decompressor 21. The audio information decompressor 21 decompresses the input audio information in a manner that is the reverse of the compression performed by the audio information compressor 13 and outputs the resultant data to a device not shown in FIG. 1 it is appreciated that the AV decoder 16-2 includes a demultiplexer, interpolation circuits, an image information decompressor, and an audio information decompressor similar to those of AV decoder 16-1.

In this specific embodiment, one HDD 3 is connected to the host device 1 via the host interface bus 2 and three channels of compressed motion image and audio data can be simultaneously recorded or reproduced. The host interface bus 2 may be a bus according to, for example, the expanded IDE (Integrated Device Electronics) standard (ATA (AT Attachment) standard) recommended by the ANSI (American National Standards Institute). The overall operation of the disk recorder is controlled by the CPU 24 in host 1. Firmware used by the CPU 24 to control the disk recorder is stored in a ROM 26. A RAM 25 is used as a work area by the CPU 24. Although not shown in FIG. 1, the disk recorder also includes user interface mechanisms such as a switch, a remote controller, a keyboard, and a liquid crystal display via which a user provides operation commands to the disk recorder and via which the disk recorder informs the user of the status of data input or output operations.

The HDD 3 performs a recording or reproducing operation in response to a WRITE or read command issued by the CPU 24 via a CPU bus 23 and the AV interface 27 wherein the WRITE and read commands are defined in the expanded IDE standard. Transmission of data between the host device 1 and the HDD 3 is controlled by the memory controller 15 and the AV interface 27 under the control of the CPU 24.

The HDD 3 includes a hard disk controller (HDC) 31. When data is input to the HDC 31 via the host interface bus 2, the HDC 31 temporarily stores the data in a buffer memory 32 and then reads and transfers the data to a recording channel signal processing circuit 33. On the other hand, when the HDC 31 receives reproduced data from a reproducing channel signal processing circuit 37, the HDC 31 temporarily stores the received data in the buffer memory 32 and then reads out the data as required via the host interface bus 2.

The recording channel signal processing circuit 33 modulates input data in accordance with a predetermined modulation method and supplies the resultant modulated data to a magnetic head (hereinafter referred to simply as a head) 35 via an amplifier 34 thereby recording the data onto the disk 45.

The head 35 also reproduces data recorded on the disk 45 and outputs it to the reproducing channel signal processing circuit 37 via an amplifier 36. The reproducing channel signal processing circuit 37 demodulates the input data in a method complementary to the modulation method of the recording channel signal processing circuit 33 and outputs the resultant demodulated data to the HDC 31.

The CPU 38 controls the HDC 31, the reproducing channel signal processing circuit 37, the recording channel signal processing circuit 33, and other components via the CPU bus 39. A servo DSP (digital signal processor) 40 generates a servo signal in accordance with reproduced data supplied from the reproducing channel signal processing circuit 37 and outputs the generated servo signal to a voice coil motor (VCM) 42 via an amplifier 41. In accordance with the servo signal, the VCM 42 moves (seeks) the head 35 over the disk 45 in the radial direction such that the head 35 comes to a position just above a particular track on the disk 45.

A spindle motor (SPM) controller 43 generates a control signal in accordance with an FG (frequency generator) signal and a PG (phase generator) signal output from a spindle motor (SPM) 44, thereby rotating the spindle motor 44 at a predetermined speed.

Figure 2:
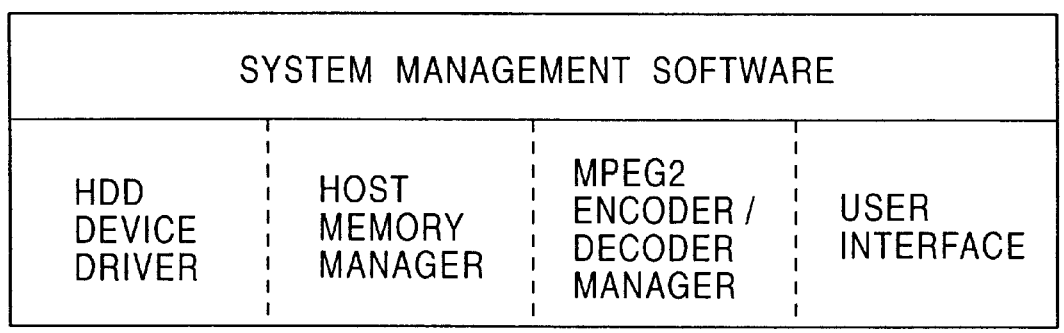
FIG. 2 is a block diagram illustrating an example of the structure of software used by a CPU 24 of a host device 1 shown in FIG. 1.

FIG. 2 illustrates the hierarchical structure of firmware which is stored in the ROM 26 and executed by the CPU 24. A first layer, that is a lower layer, of the firmware includes a user interface responsible for inputting and outputting data from and to the user interface mechanisms, an MPEG-2 encoder/decoder manager, a host memory manager for writing and reading an AV data stream or cluster to or from the host memory 22 via the memory controller 15, and an HDD device driver. An upper layer, that is a second layer, includes system management software for controlling the first layer thereby controlling the operation over the entire disk recorder. Functions which are required for the operation of the disk recorder but which are not included in the first layer, such as the function of controlling and managing the recording and reproducing operation for the respective channels and the function of managing and monitoring the status of resources such as the HDD and the host memory 22 are all included in the system management software.

Signal flows during the recording operation of the disk recorder are first described below. If an analog image signal (according to, for example, the NTSC standard) is input from the outside to the first channel (CH-1), the image information compressor 12 converts the input signal into digital form and then compresses it such that the data rate becomes about ⅕ the original value. The image information may be compressed by performing a discrete cosine transformation, interframe motion detection, requantization, two-dimensional Huffman coding or the like on the original digital image information in accordance with known techniques, such as DV or MPEG-2. An analog audio signal input together with the image signla is also converted into a digital form and compressed by the audio information compressor 13. The compressed image information and audio information are multiplexed by the MUX 14 into an AV data stream. In this specific embodiment, MPEG-2 is employed as the image information compression method, and the AV data stream has a data rate of 8 Mbits/sec.

Successive clusters of the AV data stream are stored in the host memory 22 via the memory controller 15. In accordance with the host memory manager of the firmware, the CPU 24 issues a command to the memory controller 15 to read a cluster from the host memory (each cluster is a unit of data which is read from the host memory and recorded onto the HDD 3). The cluster of data is transferred to the HDD 3 via the AV interface 27 and the host interface bus 2.

Figure 3:
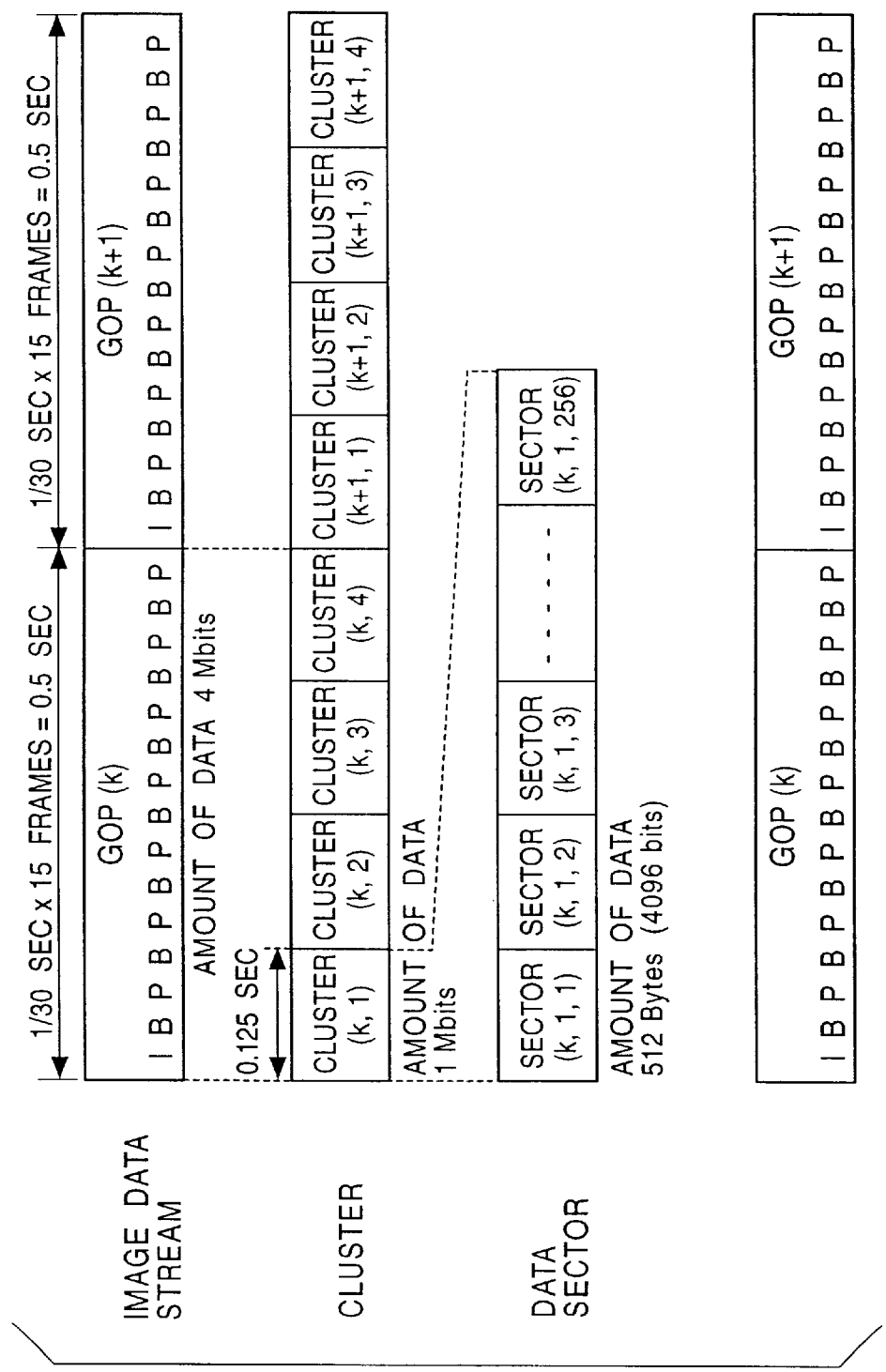
FIG. 3 illustrates the relationship between clusters and COPs according to the MEPG-2 standard, wherein clusters are units of recorded or reproduced data.

FIG. 3 illustrates the relationship between clusters and GOPs (Group of Pictures) defined in a data stream according to the MEPG-2 standard. In the example shown in FIG. 3, each cluster is an elementary unit of data, and each GOP consists of our clusters. One GOP includes 15 frames of image data wherein one frame has a length of time of 1/30 sec. As a result, one GOP has a length of time of 0.5 sec. Therefore, if the bit rate is equal to 8 Mbits/sec., the amount of data per GOP is equal to 4 Mbits. Thus, each cluster has one-forth the data of one GOP, that is, the amount of data of one cluster is equal to 1 Mbits. Because each sector of the HDD 3 has a size of 512 bytes (4096 bits), the amount of data of one cluster is nearly equal to the amount of data of one cluster is nearly equal to the amount of data of 256 sectors. Thus, each time the HDD 3 receives a write command from the host device 1, the HDD 3 continuously records an AV data stream included in approximately 256 sectors.

The HDD 3 performs the recording operation as follows. Herein, for simplicity, the recording operation is described for the case where only one data stream of the first channel is recorded.

The CPU 24 sends a command to HDD 3 to record one cluster such that the one cluster is recorded as a continuous data block with a predetermined length starting from a specific logical block address of the HDD 3. In response to the command, the HDC 31 of the HDD 3 converts, in cooperation with the CPU 38, the logical block address to an internal physical address (disk surface number, track number, sector number, etc.) of the HDD 3. Subsequently, one cluster of data (for example, 256 sectors of data) is transferred from the host memory 22 to the HDC 31 via the host interface bus 2 and temporarily stored in the buffer memory 32.

The HDC 31 divides the data into a plurality Of parts each having a length (512 bytes) corresponding to a logical data sector defined on a track of the HDD 3. The HDC 31 then generating sector data by adding a preamble pattern used to achieve bit synchronization in the reading process at the starting location of each sector of data and also adding an error correction code at the ending location. The HDC 31 outputs the resultant sector data to the recording channel signal processing circuit 33 in synchronization with disk rotation. The recording channel signal processing circuit 33 performs channel coding on the sector data so as to convert it to a binary data series in accordance with the characteristics of the magnetic recording channel consisting of the head 35 and the disk 45. The amplifier 34 generates a recording current signal with a rectangular waveform corresonding to the binary data series. In response to this recording current signal, the head 35 records a corresponding magnetic inverting pattern on the magnetic disk 45.

Figure 4:
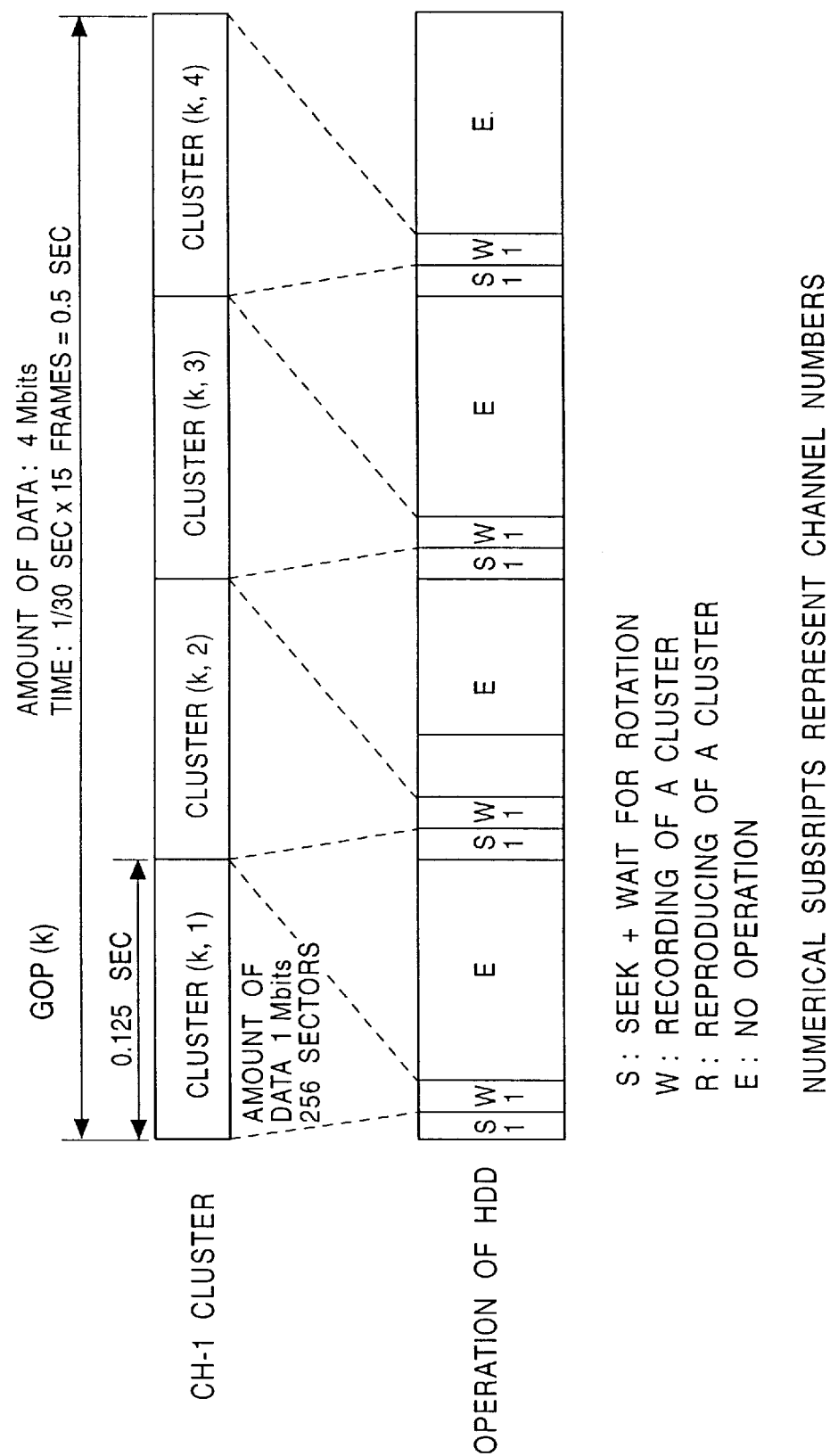
FIG. 4 is a timing chart illustrating an operation of an HDD performed when one AV data stream is recorded.

In the above operation, the head 35 must be positioned, in advance, on a target track on which the data is to be recorded. To this end, the servo DSP 40 moves the head 35 while monitoring the track numbers on the disk surface via the reproducing channel signal processing circuit 37 until the head 35 comes to a position corresponding to the physical address of the target track number specified by the HDC 31 and the CPU 38. In the above example, as shown in FIG. 4, the period of time available for recording one cluster is 125 msec. In the HDD 3, the sum of the seeking and rotation waiting time (S1) and the recording operation time (W1) is about 30 msec, although this value depends on the speed and performance of the HDD 3. The remainder of the 125 msec period is identified as the remaining available period of time (E).

Signal flows during the reproducing operation are described below.

First, the system management software identifies the name of an AV data stream to be reproduced, in accordance with input information supplied from the user interface of the firmware. The system management software then determines logical block addresses of those clusters forming the stream to be reproduced and makes the HDD device driver issue a read command on the host interface bus 2 (such as an IDE interface) thereby reading the clusters. The host memory manager allocates, via the memory controller 15, a recording area in the host memory 22 for cluster reconstruction.

The read command issued over the IDE interface is supplied to the CPU 38 vaia the HDC 31 of the HDD 3. The CPU 38 converts the logical block addresses of the clusters to corresponding physical addresses (disk surface numbers, track numbers, sector numbers) of the disk 45 and makes the servo DSP 40 move the head 35 to the first physical address so as to start reading data. Thus, a magnetic inverting pattern recorded on the disk 45 is read via the head 35 and amplified by the amplifier 36. The reproducing channel signal processing circuit 37 performs bit synchronization and detects the binary data series. The reproducing channel signal processing circuit 37 decodes the binary data series in a manner complementary to the channel encoding performed during the recording process.

The resultant sector data is sent to the HDC 31 and subjected to an error correction process. The data is then successively stored in the form of logical data in units of 512 bytes in the buffer memory 32. After that, the data is successively transferred to the host memory 22 via the host interface bus 2 and the memory controller 15 to form one cluster. After completion of reading one cluster, a command to read the next cluster is issued, and a set of sector data is read from the HDD 3 to form a corresponding cluster in the host memory 22 in a similar manner. The clusters formed in the above-described manner are successively read and supplied as an AV data stream to, for example, the AV decoder 16-1 of the first channel.

The demultiplexer 17 separates the AV data stream into image data and audio data. The image data is applied to the interpolation circuit 18. If the image data contains an error, the error is corrected by interpolation circuit 18 by means of interpolation from previous and following image data. The output of the interpolation circuit 18 is then supplied to the image information decompressor 19 and decompressed into image information exhibiting a normal form. The obtained image information is further converted to an analog image signal (such as an NTSC signal) by a digital-to-analog converter and supplied to an external monitor or the like.

The signal flows have been described above for the case where compressed image data is recorded and reproduced via only the first channel. When a plurality of data streams are recorded or reproduced via a plurality of channels including the second or third channel, the operation is performed as follows.

Figure 5:
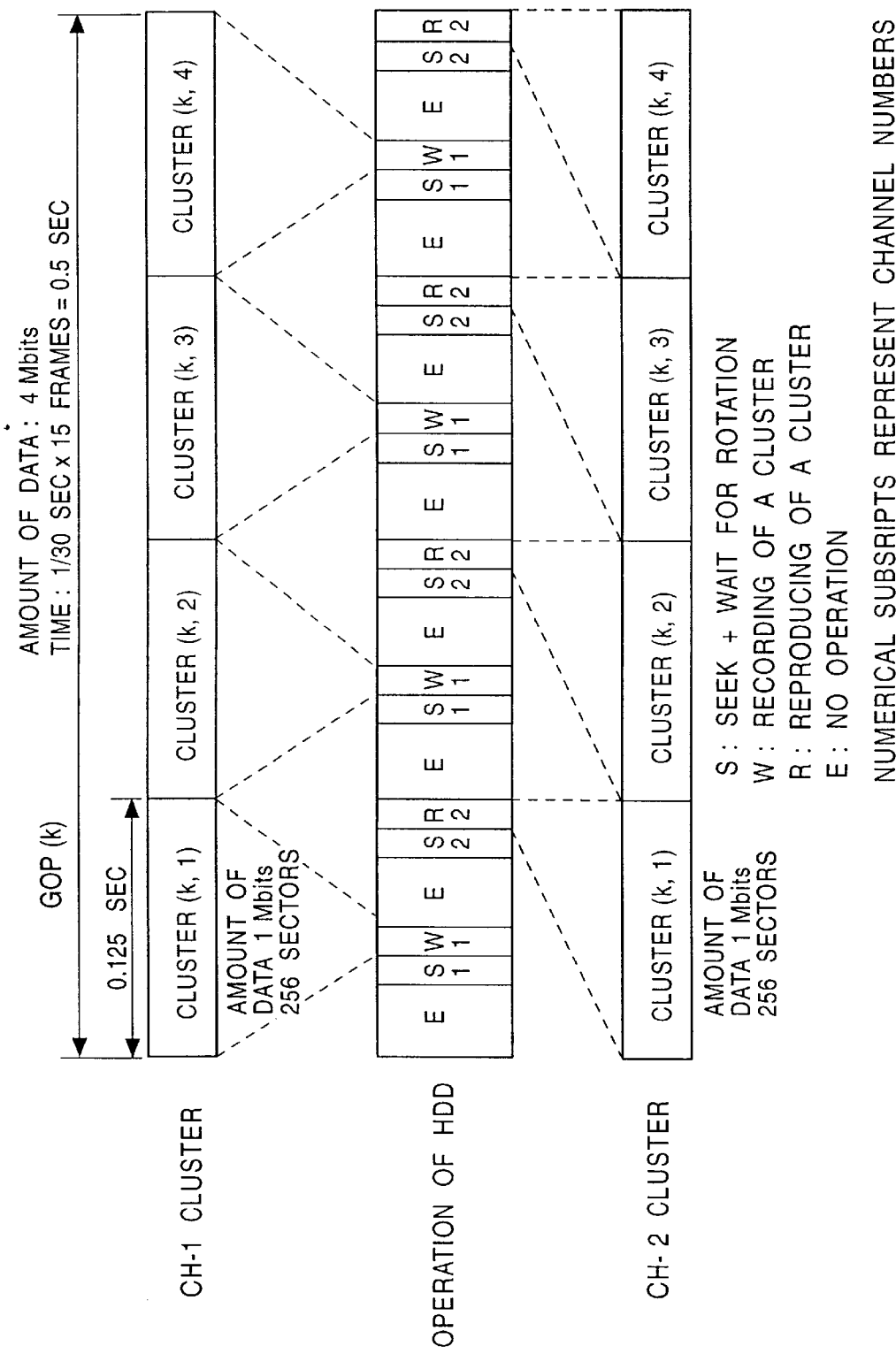
FIG. 5 is a timing chart illustrating an operation of the HDD performed when a plurality of AV data streams are recorded/reproduced concurrently.

FIG. 5 is a timing chart illustrating an example of an operation in which a data stream of the first channel is recorded and, at the same time, a data stream of the second channel is reproduced. The HDD 3 is capable of recording or reproducing only one cluster at a time. Therefore, in order to process clusters for two different channels, recording and reproducing are performed alternately for the two channels. For example, seeking and rotation waiting (S1) are performed so as to access an area where a cluster (k, 1) of the first channel is to be recorded, and then the cluster (k, 1) is recorded (W1) in that area. After completion of the following no-operation period of time (remaining available period of time, E), seeking and rotation waiting (S2) are performed so as to reproduce a cluster in the second channel. This seeking operation is required because clusters for different channels are located, in general, on tracks with different radii on the disk. The cluster (k, 1) for the second channel is then reproduced (R2). After that, the sequence of operations described above is performed repeatedly. In the example shown in FIG. 5, although recording and reproducing associated with the two channels are performed concurrently onto or from one HDD 3, there is still a time margin (E) during which no operation is carried out.

Figure 6:
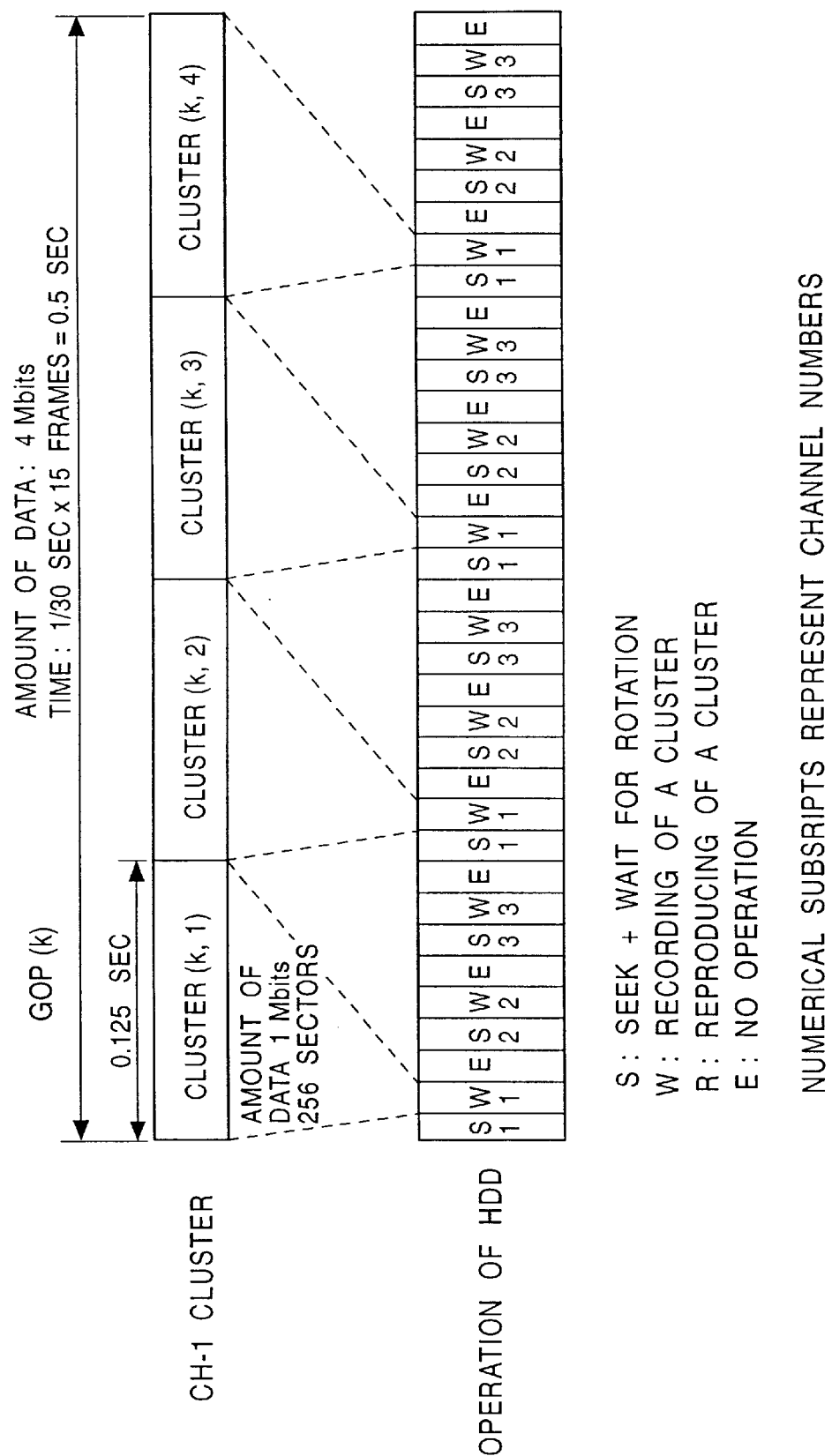
FIG. 6 is a timing chart illustrating an operation of the HDD performed when three AV data streams are recorded/reproduced concurrently.

FIG. 6 is a timing chart illustrating an example of an operation in which recording is performed concurrently for three channels (CH-1, CH-2, and CH3). In the host device 1, three data streams, that is, a data stream generated by the CH-1 AV encoder 11-1, a data stream generated by CH-2 AV encoder 11-2, and a data stream generated by the CH-3 AV encoder 11-3 are supplied to the host memory 22 via the memory controller 15 and temporarily stored therein. Each of these three data streams is divided into clusters, and the clusters are recorded on the HDD 3 in turn for the three data streams in response to a write command issued via the host interface bus 2. Thus, the HDD 3 records clusters in turn for the three channels wherein one cluster at a time is recorded as in the case where recording is performed concurrently for two channels as described above with reference to FIG. 5.

In this case, as shown in FIG. 6, the HDD 3 is busy performing seeking and recording operations, and the time margin E becomes very small. That is, when the disk recorder performs concurrently a recording or reproducing operation for the maximum number of channels that can be accommodated by the speed of the HDD 3, it is difficult to obtain a large time margin.

As can be seen from the above description, the operation of the HDD 3 varies depending on the number of channels handled thereby at a given time. For a recorder capable of performing a recording/reproducing operation for up to three channels concurrently, the HDD 3 has a very small time margin when operating concurrently for three channels, while the time margin is quite large when the HDD 3 operates on only one channel. In a practical operation, however, the disk recorder does not always operate with the maximum allowable number of channels, and the number of channels sometimes drops to a lower value, even to zero. The system management software of the disk recorder monitors the status of the operation of the disk recorder, such as the number of channels being handled thereby, and this means that the time margin of the HDD 3 is monitored by the system management software.

In the disk recorder according to the present invention, the remaining available period of time (or no-operation period of time E) of the HDD 3 is monitored by the system management software of the host device 1 and used in an efficient fashion such that seek retries, write retries, and read retries may be performed as many times as possible during the remaining available period of time E. To this end, particular commands are introduced herein which are issued by the host device 1 via the host interface bus 1 to perform a seek retry, a write retry, and a read retry. Thus, seek retry, write retry and read retry, which are needed to achieve high reliability in the operation of the HDD 3, are controlled by the host device for a period of time permitted by the status of the operation of the disk recorder.

Examples of processes performed to execute a seek retry, a write retry and a read retry under the control of the host device 1 are described below.

First, an example of the process performed by the host device 1 to specify the maximum allowable number of read retries which may be executed when an error is detected in reproduced data is described below.

Figure 7:
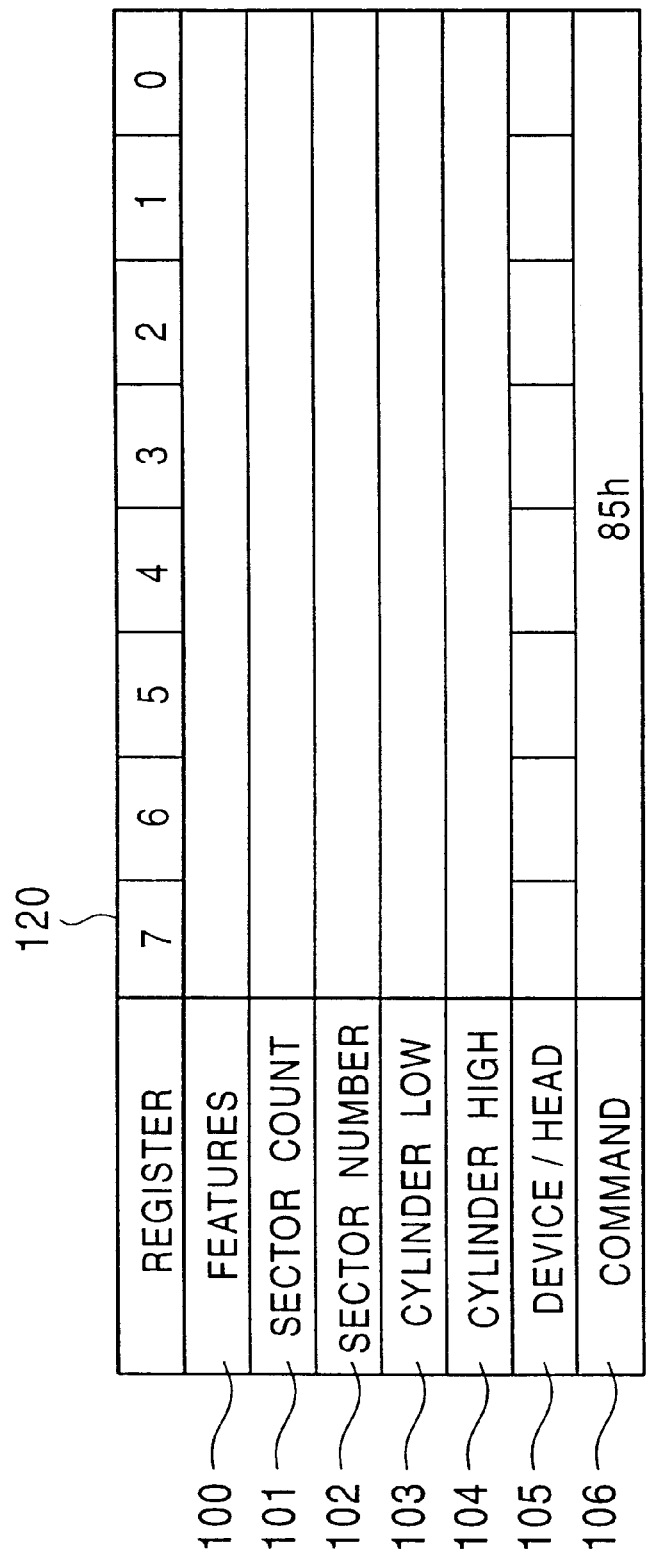
FIG. 7 illustrates the format of an AV mode setting command.

FIG. 7 illustrates the structure of an AV mode setting command 120 used to set the operating mode when recording or reading the AV stream data. A command identification code (for example, 85h) which specifies the AV mode setting operation is stored in a command register 106. As the data (parameters) of the command 120, data (parameters) 121 is sent from the CPU 24 of the host device 1 to the HDD 3 wherein the data 121 has the structure shown in FIG. 8. The data 121 includes various parameters defining the operating mode in the reading, recording, and seeking operations for AV stream data. The maximum numbers of retries allowed for one command during reproducing and recording operations are described in the data 121. In the example shown in FIG. 8, byte 0 of the data 121 represents the maximum allowable number of read retries, byte 1 of the data 121 represents the maximum allowable number of write retries, and byte 2 of the data 121 represents the maximum allowable number of seek retries. Although other parameters are also provided for in the data 121, they are not shown in FIG. 8.

Figure 9:
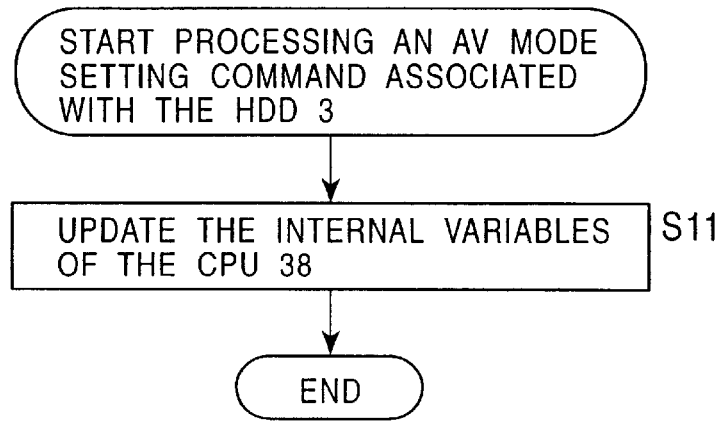
FIG. 9 is a flow chart illustrating an AV mode setting command process for setting the HDD 3 shown in FIG. 1.

When the HDC 31 and the CPU 38 of the HDD 3 receive a command 120 and data (parameters) 121, the maximum allowable numbers of retries are set as shown in the flow chart of FIG. 9. Note that although the operation parameter data 121 includes not only the maximum allowable numbers of retries but also other parameters associated with the AV-mode operation, they are not used in FIG. 9.

The CPU 38 changes the maximum allowable numbers of retries associated with seek, read, and write operations stored in a RAM area provided in the CPU 38 from 1 to values specified by the parameter data 121 of the command 120 (step S11). After that, the CPU 38 executes a WRITE or read command in which retries of seek, read, and write operations are performed, if necessary, up to the number of times specified by the above variables. Thus, the host device 1, by specifying the maximum allowable numbers of retries for one command, controls the increase in the execution time per command.

Figure 10:
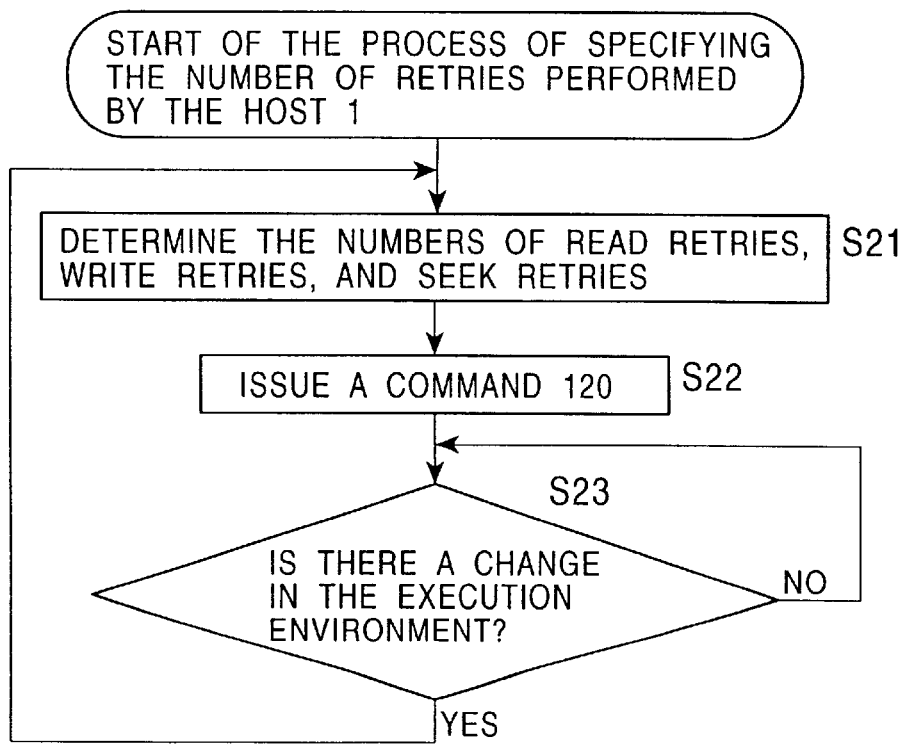
FIG. 10 is a flow chart illustrating an AV mode setting command process performed by the host device 1 shown in FIG. 1.

In the case where AV stream data is transferred between the host device 1 and the HDD 3, the CPU 24 of the host device 1 performs the following process using the AV mode setting command 120 as described below with reference to the flow chart shown in FIG. 10.

The CPU 24 of the host device 1 determines the maximum allowable number of retries when recording or reproducing data for a predetermined number of channels within a predetermined period of time, taking into account the current number of channels, the remaining available period of time, and the cluster size (step S21). In the example shown in FIG. 4, because recording is performed only for one channel, 256 sectors are written during 0.125 sec and thus there is a long remaining available time E. Consequently, the number of retries within the remaining available time E may be increased. On the other hand, in the example shown in FIG. 6 in which recording is performed concurrently for three channels, the remaining available time E is shorter than that for the example of FIG. 4, so the CPU 24 sets the number of retries to a smaller value.

The CPU 24 of the host device 1 then issues a command 120 to the HDD 3 to set the maximum allowable number of retries (step S22). The CPU 24 performs steps S21 and 22 each time there is a change in the execution environment parameters, such as the number of recording/reproducing channels, the remaining available time, and the cluster size, thereby setting the number of retries to optimum values (step S23).

A second example of the process performed by the host device 1 to specify the maximum allowable number of read retries which are executed when an error is detected in reproduced data is described below.

FIG. 11 illustrates an AV stream read command 122 to perform the read process. When the read command is executed to transfer AV stream data, the maximum allowable number of retries which is valid only for this command is specified using, for example, a feature register 100. In the command 122, like the read command according to the ATA standard, the number of sectors to be read is specified by a sector count register 101, and read starting logical block addresses are specified by the lower-order four bits of a sector number register 102, a cylinder low register 103, a cylinder high register 104, and a device/head register 105, respectively. Furthermore, in the command 122, a command identification code (for example, 86h), identifying this command as calling for the AV stream data read process, is stored in a command register 106.

Figure 12:
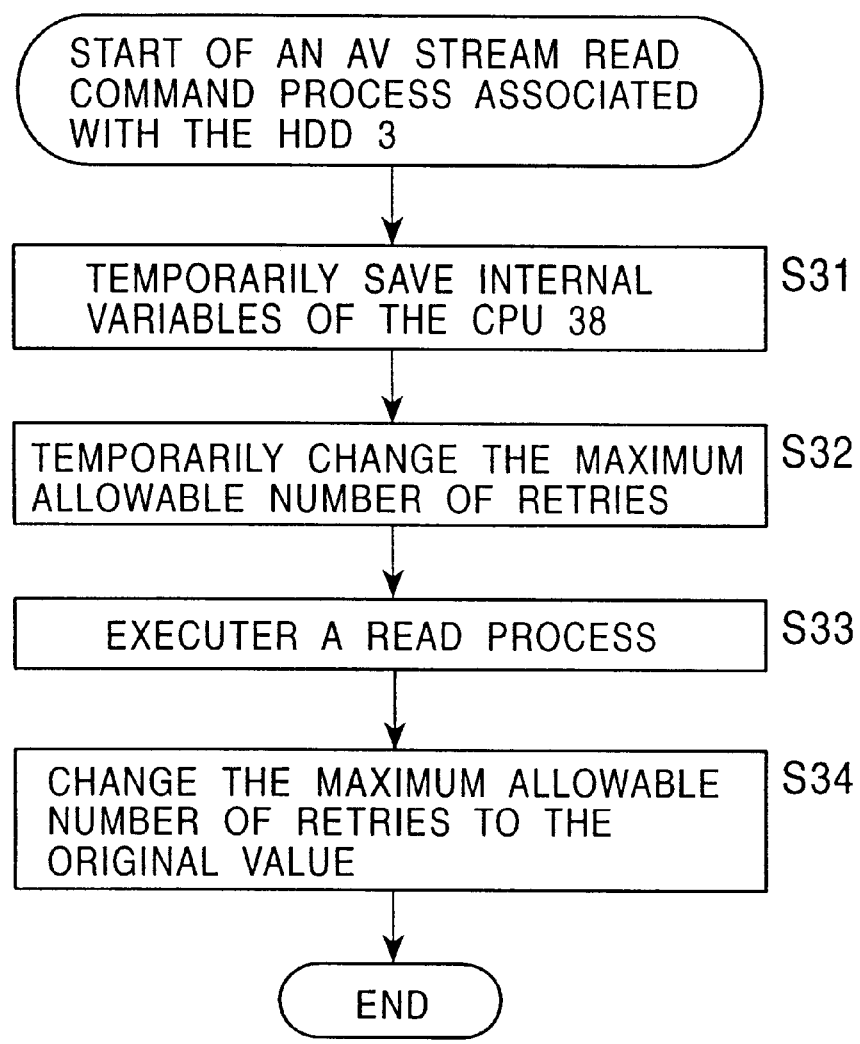
FIG. 12 is a flow chart illustrating an AV stream read command process performed by the HDD 3 shown in FIG. 1.

Upon reception of the command 122, the HDC 31 and the CPU 38 of the HDD 3 read AV stream data as described below with reference to the flow chart shown in FIG. 12.

The CPU 38 temporarily transfers the value of the maximum allowable number of read retries stored in a RAM area provided internally of the CPU 38 into another memory area (step S31). After that, as represented by step S32, the value of the variable representing the maximum allowable number of read retries is changed to a value specified by the feature register 100 of the command 122 and maintained during the period in which an area on the disk 45 specified by the command 122 is accessed in the next step S33. then reading is executed (step S33). After completion of the reading process, the maximum allowable number of retries which was temporarily transferred in step S31 is restored in the original memory area (step S34).

For each command, the maximum allowable number of retries is specified by the host device 1 in the above-described manner, and thus the CPU 24 of the host device 1 controls the execution time of each command. By this technique, the maximum allowable number of retries may be changed temporarily, without using the command 120 shown in FIG. 7.

Figure 13:
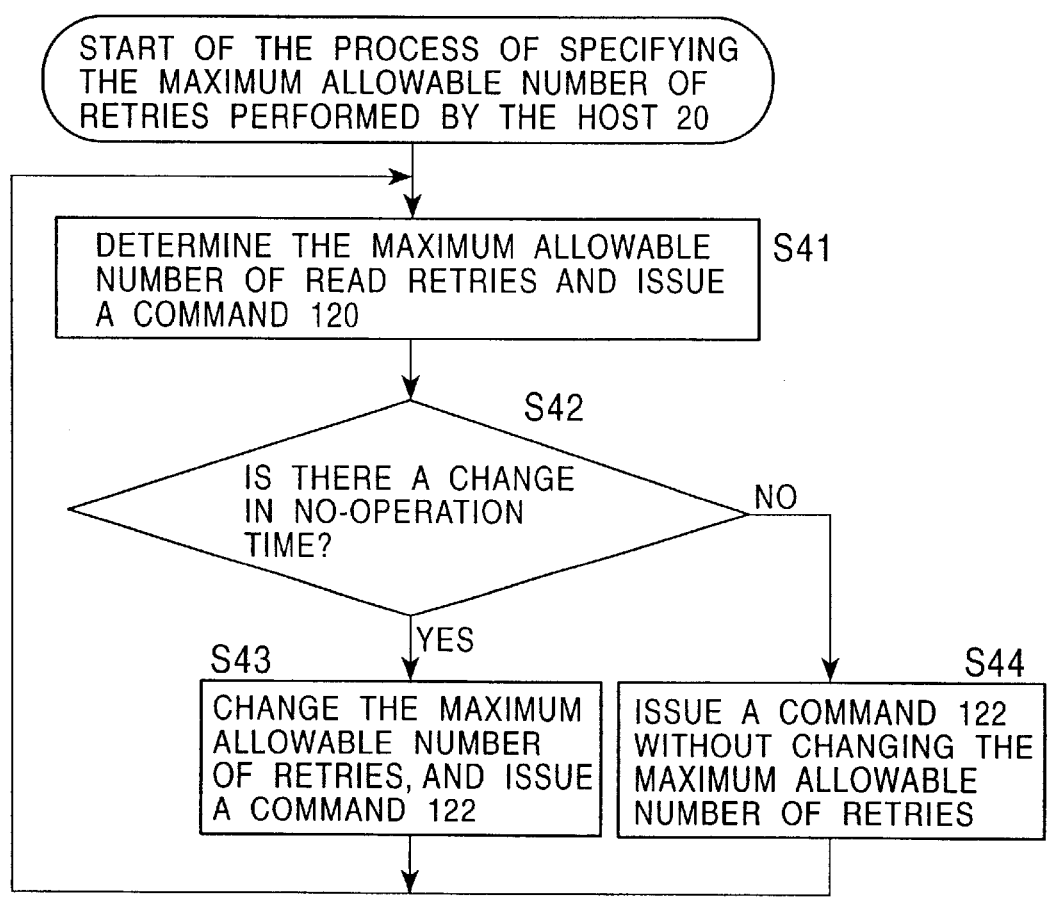
FIG. 13 is a flow chart illustrating a process performed by the host device 1 shown in FIG. 1 to specify the maximum allowable number of retries.

In the case where AV stream data is transferred between the host device 1 and the HDD 3, the CPU 24 of the host device 1 performs the process described in conjunction with the flow chart shown in FIG. 13, using the AV stream read command 122 defined above.

As in the first example of the above-described operation, the CPU 24 of the host device 1 determines the maximum allowable number of retries for recording or reproducing data for a predetermined number of channels within a predetermined period of time (0.125 sec in the example shown in FIG. 6). The CPU 24 issues a command 120 (step S41), taking into account the current number of channels, the remaining available times, and the cluster size. When the command 120 is issued as command 121, which specifies the maximum allowable number of retries determined for the worst case, where retries occur in all commands, if no retry occurs in an actual operation, then the remaining available time E increases with the elapsed time in the predetermined operating period. Inquiry S42 determines whether or not the remaining available time has changed. If a change in the remaining available time is detected, an AV stream data read command 122 may be issued at the end of the predetermined period of time such that a temporarily increased maximum allowable number of retries is specified so as to reduce the probability of a read error (step S43). If no change occurs in the remaining available time, a command 122 is issued without changing the maximum allowable number of retries (step S44).

FIG. 14 illustrates the structure of an AV stream write command 123 introduced herein. When a write command is executed and AV stream data is transferred, the maximum allowable number of retries which is valid only for that command is specified by, for example, the feature register 100. Also in the command 123, as in the write command according to the ATA standard, the number of sectors to be recorded is specified in the sector count register 101, and write starting logical block addresses are specified by the lower-order four bits of a sector number register 102, a cylinder low register 103, a cylinder high register 104, and a device/head register 105, respectively. Furthermore, in the command 123, a command identification code (for example, 87h), identifying this command as calling for the AV stream data write process, is stored in a command register 106.

Upon reception of the command 123, the HDC 31 and the CPU 38 of the HDD 3 record AV stream data in a manner similar to that where the reading operation is performed in response to the command 122.

Figure 15:
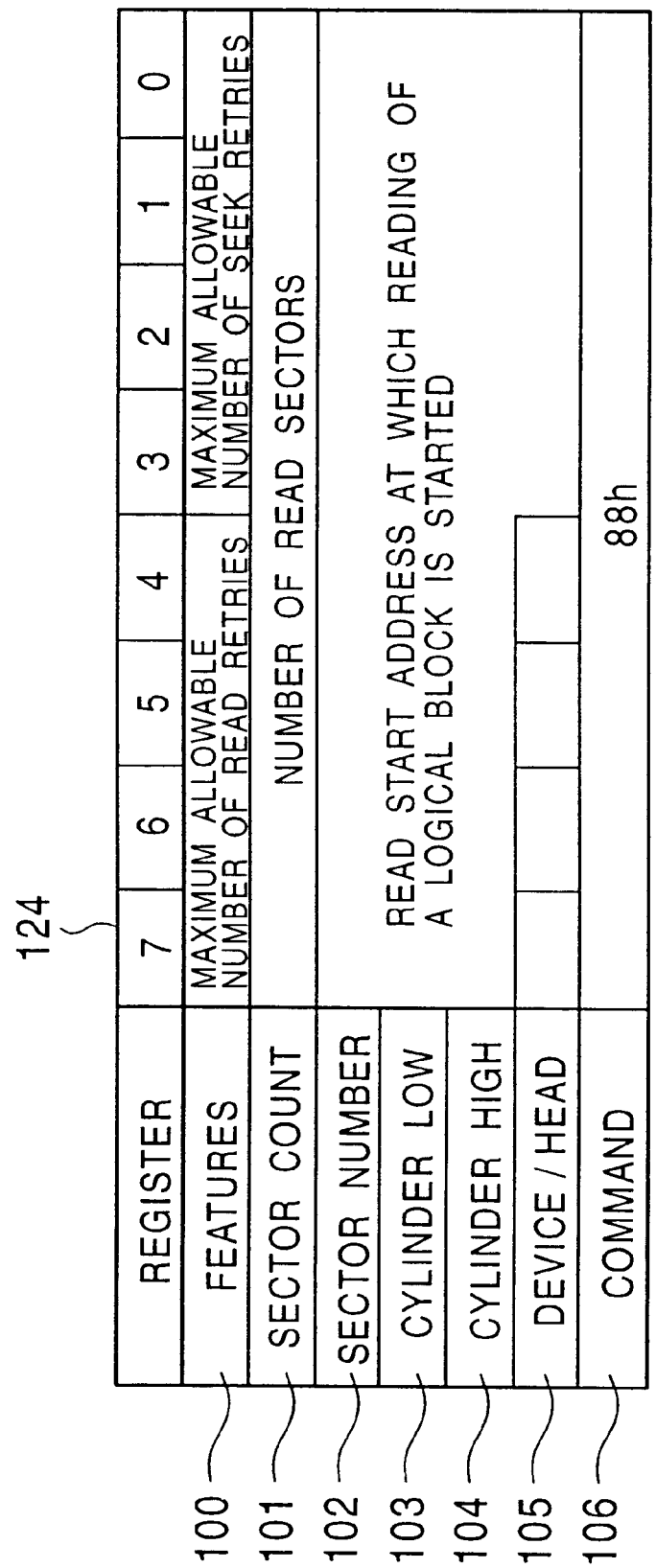
FIG. 15 illustrates the format of an AV stream read command (specifying the maximum allowable number of seek retries)

FIG. 15 illustrates the structure of an AV stream read command 124. In this AV stream read command 124, the maximum allowable number of seek retries is also specified. For aforedescribed command 122, when a read command is executed and AV stream data is transferred, only the maximum allowable number of read retries which is valid only for that command is specified using the feature register 100. In contrast, for command 124, the higher-order four bits of the feature register 100 are used to specify the maximum allowable number of read retries, and the lower-order four bits are used to specify the maximum allowable number of seek retries. Furthermore, in the command 124, a command identification code (for example, 88h), identifying this command as calling for the AV stream data read process, is stored in command register 106.

A read error can be corrected to a certain degree by performing interpolation between previous and following data. But, when a seek error occurs, data is not read correctly over an entire sector or data sectors, and thus a seek error can cause a large burst error that is not readily corrected by interpolation. To minimize this problem, the maximum allowable number of seek retires is set to a larger number than the maximum allowable number of read retries. This allows the disk recorder to perform the read command in a more reliable fashion. Accordingly, the CPU 24 sets the maximum allowable number of seek retries to a value greater than the maximum allowable number of read retries.

Upon reception of the command 124, the HDC 31 and the CPU 38 of the HDD 3 record AV stream data in a manner similar to that described above where the command 122 is received.

FIG. 16 illustrates the structure of an AV stream write command 125 which also specifies the maximum allowable number of seek retries. In this command 125, as in the command 124, the higher-order four bits of the feature register 100 are used to specify the maximum allowable number of write retries, and the lower-order four bits are used to specify the maximum allowable number of seek retries. Furthermore, in the command 125, a command identification code (for example, 89h), identifying this command as calling for the AV stream data write process is stored in command register 106. By specifying the maximum allowable number of seek retries, the reliability of the write command of the disk recorder is improved.

Upon reception of the command 125, the HDC 31 and the CPU 38 of the HDD 3 record AV stream data in a manner similar to that when the command 123 is received.

Yet another example of a process performed by the host device 1 to specify the maximum allowable number of read retries which are executed when an error in the reproduced data is detected is described below.

Figure 17:
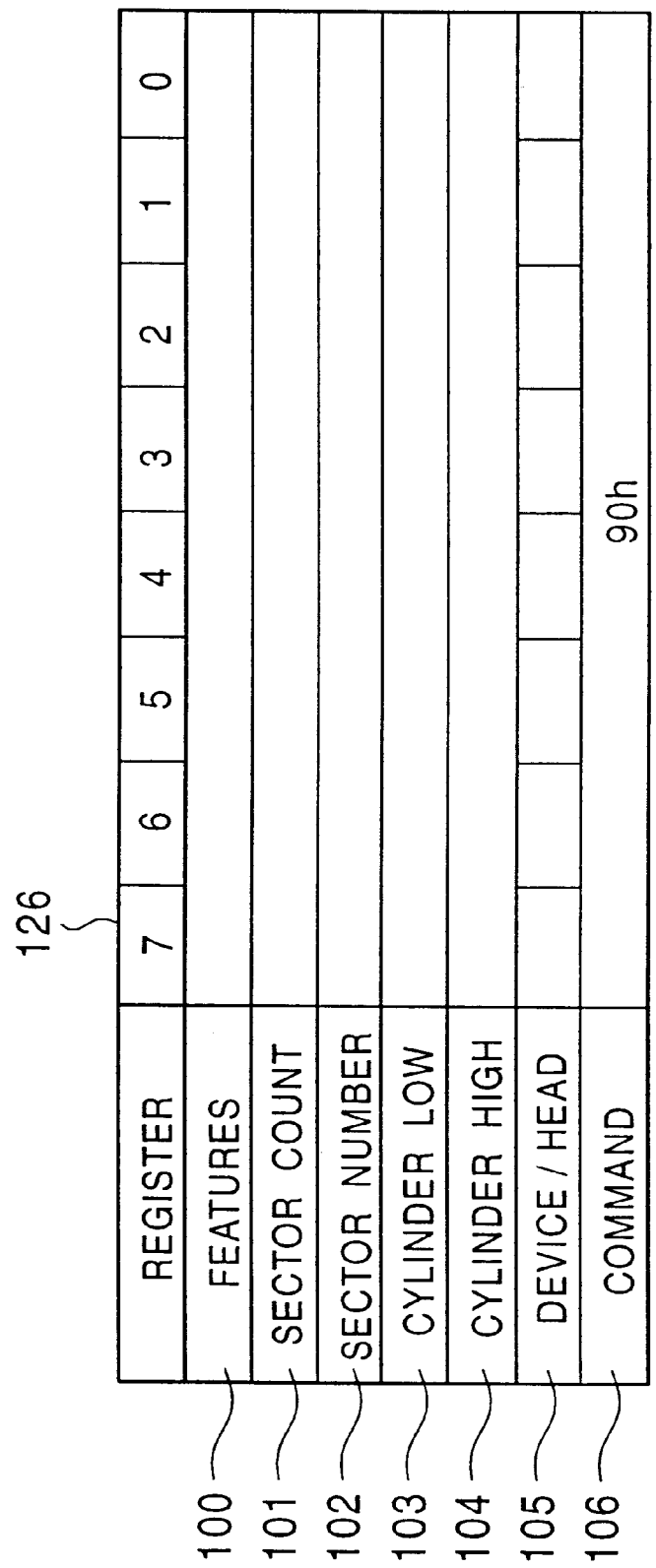
FIG. 17 illustrates the format of a retry status sense command.

In this example, as in the previously described examples, the maximum allowable number of retries is specified using the AV mode setting command 120 with the data 121 of FIG. 8, and the maximum allowable number of retries is temporarily changed for each command using the command 122. In addition, a retry status sense command 126 is provided, as shown in FIG. 17, with the command identification code (for example, 90h), indicating the retry status sense process, is stored in command register 106. The command 126 includes status information 127 (shown in FIG. 18) which describes the length of delay attributed to the retry of a seeking, recording, or reproducing operation call for by an immediately preceding read or write command. The status information 127 represents the delay time in units of seconds or in units of time required for one revolution of the disk 25.

Figure 19:
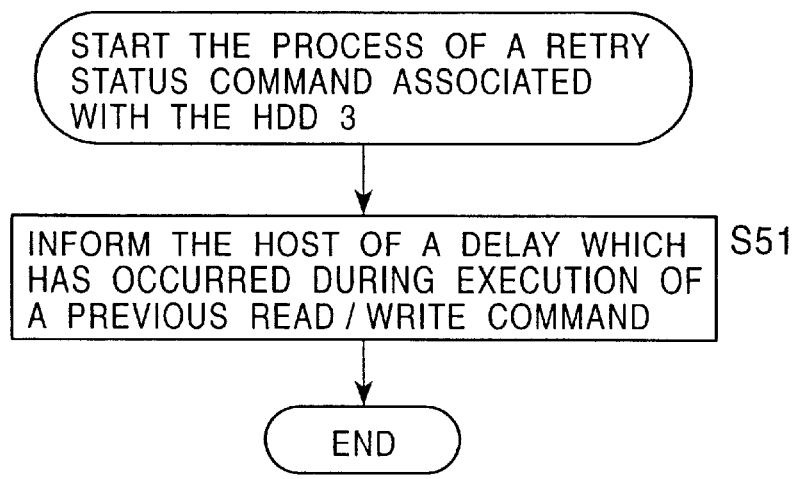
FIG. 19 is a flow chart illustrating a retry status sense command process performed by the HDD 3 shown in FIG. 1.

Upon reception of the command 126, the HDC 31 and the CPU 38 of the HDD 3 report the delay time which has occurred due to the retry of the process performed in response to an immediately preceding read or write command, as will now be describe in conjunction with the flow chart shown in FIG. 19. The CPU 38 measures the delay time which occurs during a process performed in response to a read or write command (in step S43 or S44 in the example shown in FIG. 13) and stores the measured delay time in a memory provided in the CPU 38. If the CPU 38 receives a command 126, the CPU 38 sends status information 127 to notify the CPU 24 of the host device 1 of the delay time (step S51). As described above, the host device 1 issues the command 126 so that the CPU 24 of the host device 1 can acquire the delay time information attributed to a retry and so that the maximum allowable number of retries for a following command is properly controlled depending on the acquired delay time.

Figure 20:
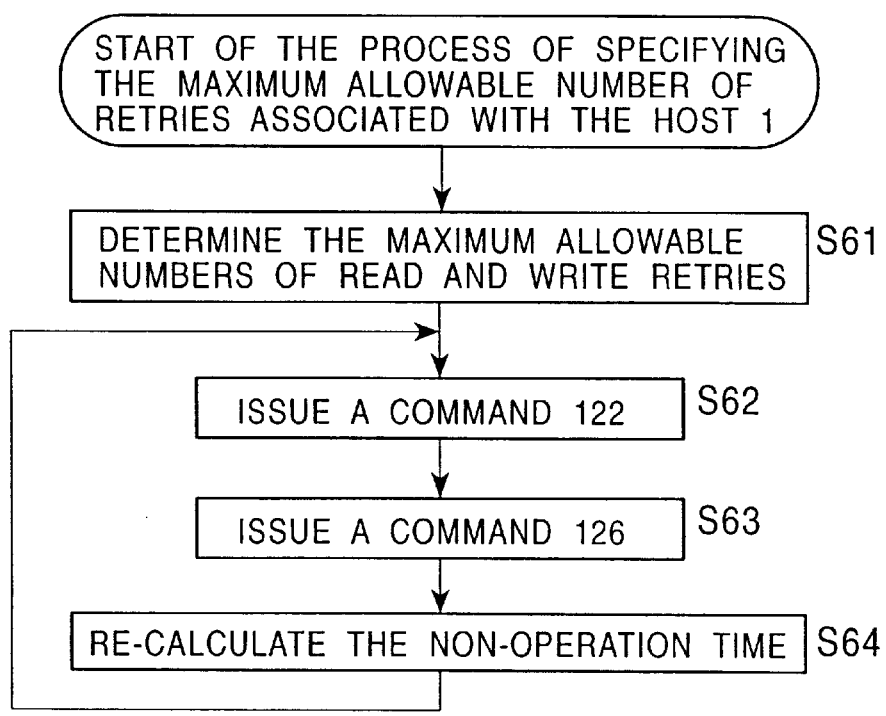
FIG. 20 is a flow chart illustrating a process performed by the host device 1 shown in FIG. 1 to specify the maximum allowable number of retries.

When AV stream data is transferred between the host device 1 and the HDD 3, the CPU 24 of the host device 1 performs the process represented by the flow chart of FIG. 20, using the AV read/write command 126 defined above.

As in the examples described above, the CPU 24 of the host device 1 determines the maximum allowable number of retries for a write or read operation for a predetermined number of channels within a predetermined period of time (0.125 sec in the example shown in FIG. 4), taking into account the current number of channels, the remaining available time, and the cluster size, and the CPU 24 issues a command 120 thereby setting the maximum allowable number of retries (step S61). The CPU 24 then issues a command 122 to read data (step S62). Subsequently, the CPU 24 issues a command 126 to acquire information representing the delay time which has occurred during the process performed in response to the command 122 (step S63). When the CPU 24 obtains status information 127 corresponding to the command 126 from the HDD 3, the CPU 24 recalculates the remaining available period of time on the basis of the delay time information (step S64). The recalculated remaining period of time is used to determine the maximum allowable number of retries before issuing the next command 122.

Although in the above embodiments, retries are limited by the maximum allowable number of retries, retries may also be limited by the maximum period of time allowed for retries.

Furthermore, although in the above embodiments, a magnetic disk (hard disk) is employed as the recording medium, another type of record medium such as an optical disk or a magneto-optical disk may be used. The present invention may also be applied to a removable HDD or to other types of magnetic disk devices.

The computer program which establishes the above process may be stored on a record medium, such as a magnetic disk, a CD-ROM, or a solid-state memory; or may be supplied by a communication medium such as a network, a satellite, etc.

What is claimed is:
1. A record medium drive device connected to an information processing apparatus and operable to record information supplied from said information processing apparatus onto a record medium within said drive device, reproduce information from said record medium and output the reproduced information to said information processing apparatus, and re-execute a seek, record, or reproduce operation if an error occurs in the seek, record, or reproduce operation, said record medium drive device comprising:

control signal receiving means for receiving a control signal generated by and output from said information processing apparatus to control said re-execution;

re-execution control means for controlling said
re-execution in accordance with said control signal
output from said information processing apparatus; and delay time data transmission means for transmitting to
said information processing apparatus data representing a delay time caused by said re-execution.

2. A record medium drive device connected to an information processing apparatus and operable to record information supplied from said information processing apparatus onto a record medium within said drive device, reproduce information from said record medium and output the reproduced information to said information processing apparatus, and re-execute a seek, record, or reproduce operation if an error occurs in the seek, record, or reproduce operation, said record medium drive device comprising:

control signal receiving means for receiving a control signal generated by and output from said information processing apparatus to control said re-execution; and re-execution control means for controlling said re-execution in accordance with said control signal output from said information processing apparatus;

wherein said re-execution control means selectively controls the maximum allowable number of re-executions or the maximum period of time allowed for re-executions; and the maximum allowable number of seek re-executions is greater than the maximum allowable number of record or reproduce re-executions.

3. A record medium drive device connected to an information processing apparatus and operable to record information supplied from said information processing apparatus onto a record medium within said drive device, reproduce information from said record medium and output the reproduced information to said information processing apparatus, and re-execute a seek, record, or reproduce operation if an error occurs in the seek, record, or reproduce operation, said record medium drive device comprising:

control signal receiving means for receiving a control signal generated by and output from said information processing apparatus to control said re-execution; and re-execution control means for controlling said re-execution in accordance with said control signal output from said information processing apparatus;

wherein said re-execution control means selectively controls the maximum allowable number of re-executions or the maximum period of time allowed for re-executions; and the maximum period of time allowed for seek re-executions is greater than the maximum period of time allowed for record or reproduce re-executions.

4. A record medium drive device connected to an information processing apparatus and operable to record information supplied from said information processing apparatus onto a record medium within said drive device, reproduce information from said record medium and output the reproduced information to said information processing apparatus, and re-execute a seek, record, or reproduce operation if an error occurs in the seek, record, or reproduce operation, said record medium drive device comprising:

control signal receiving means for receiving a control signal generated by and output from said information processing apparatus to control said re-execution; and re-execution control means for controlling said re-execution in accordance with said control signal output from said information processing apparatus;

wherein said re-execution control means selectively controls the maximum allowable number of re-executions or the maximum period of time allowed for re-executions; and said maximum allowable number of re-executions or said maximum period of time allowed for re-executions dynamically varies during a respective seek, record, or reproduce operation.

5. An information processing apparatus connectable to a record medium drive device which re-executes a seek, record, or reproduce operation if an error occurs in the seek, record, or reproduce operation, said information processing apparatus being operable to record or reproduce information onto or from a record medium within said drive device and comprising:

management means for managing a delay time caused by said re-execution performed when an error occurs in the seek, record, or reproduce operation of said drive device, said management means receiving from said drive device delay time information representing the delay time caused by said re-execution;

generation means for generating a control signal in accordance with said delay time managed by said management means for controlling said re-execution by said drive device; and transmission means for transmitting said control signal generated by said generation means to said drive device to thereby control said re-execution.

6. The apparatus of claim 5, wherein said generation means generates a control signal for selectively controlling the maximum allowable number of re-executions or the maximum period of time allowed for re-executions.

7. The apparatus of claim 6, wherein said drive device operates with a number of information channels for concurrent processing of information; and wherein said generation means generates said control signal in accordance with the number of information channels with which said drive device operates.

8. The apparatus of claim 6, wherein said generation means additionally generates a control signal for commanding a seek, record, or reproduce operation.

9. A method performed by an information processing apparatus connectable to a record medium drive device which re-executes a seek, record, or reproduce operation if an error occurs in the seek, record, or reproduce operation, said information processing apparatus being operable to record or reproduce information onto or from a record medium within said drive device, said method comprising the steps of:

managing a delay time caused by said re-execution performed when an error occurs in the seek, record, or reproduce operation of said drive device;

receiving from said drive device delay time information representing the delay time caused by said re-execution;

generating a control signal in accordance with said managed delay time for controlling said re-execution by said drive device; and transmitting said generated control signal to said drive device to thereby control said re-execution.

10. A computer readable storage medium having stored thereon a computer readable program which controls an information processing apparatus connectable to a record medium drive device which re-executes a seek, record, or reproduce operation if an error occurs in the seek, record, or reproduce operation, said information processing apparatus being operable to record or reproduce information onto or from a record medium within said drive device, said program controlling said information processing apparatus to perform a process comprising the steps of:

managing a delay time caused by said re-execution performed when an error occurs in the seek, record, or reproduce operation of said drive device;

receiving from said drive device delay time information representing the delay time caused by said re-execution;

generating a control signal in accordance with said managed delay time for controlling said re-execution by said drive device; and transmitting said generated control signal to said drive device to thereby control said re-execution.

11. An information recording and reproducing system comprising an information processing apparatus; and a record medium drive device connected to said information processing apparatus and operable to re-execute a seek, record, or reproduce operation when an error occurs in the seek, record, or reproduce operation, record information supplied from said information processing apparatus onto a record medium within said drive device, and reproduce the information recorded on said record medium and output the reproduced information to said information processing apparatus, said drive device comprising:

control signal receiving means for receiving a control signal generated by and output from said information processing apparatus to control said re-execution; and re-execution control means for controlling said re-execution in accordance with said control signal output from said information processing apparatus;

and said information processing apparatus comprising:

management means for managing a delay time caused by said re-execution by said drive device, said management means receiving from said drive device delay time information representing the delay time caused by said re-execution;

generation means for generating a control signal in accordance with said delay time managed by said management means for controlling said re-execution by said drive device; and transmission means for transmitting said control signal generated by said generation means to said drive device to thereby control said re-execution.

12. In an information recording and reproducing system having an information processing apparatus and a recording medium drive device connected to said information processing apparatus and operable to: re-execute a seek, record, or reproduce operation when an error occurs in the seek, record, or reproduce operations, record information supplied from said information processing apparatus onto a record medium within said drive device, and reproduce the information recorded on said record medium and output the reproduced information to said information processing apparatus, a method for controlling the re-execution of an operation, comprising the steps of:

receiving a control signal generated by and output from said information processing apparatus to control said re-execution;

controlling said re-execution in accordance with said control signal output from said information processing apparatus, managing a delay time caused by said re-execution performed when an error occurs in the seek, record, or reproduce operation of said drive device;

receiving from said drive device delay time information representing the delay time caused by said re-execution;

generating said control signal in accordance with said managed delay time; and transmitting said generated control signal from said information processing apparatus to said recording medium driving apparatus, to thereby control said re-execution.

13. A computer readable storage medium having stored thereon a computer readable program which controls an information recording and reproducing system comprising an information processing apparatus; and a record medium drive device connected to said information processing apparatus and operable to re-execute a seek, record, or reproduce operation when an error occurs in the seek, record, or reproduce operation, recording information supplied from said information processing apparatus onto a record medium within said drive device, and reproduce the information recorded on said record medium and output the reproduced information to said information processing apparatus, said program controlling said record medium drive device to:

receive a control signal generated by and output from said information processing apparatus to control said re-execution, and control said re-execution in accordance with said control signal;

said program additionally controlling said information processing apparatus to:

manage a delay time caused by said re-execution performed when an error occurs in the seek, record, or reproduce operation of said drive device;

receive from said drive device delay time information representing the delay time caused by said re-execution;

generate said control signal in accordance with said managed delay time; and transmit said generated control signal to said drive device.

14. A record medium drive device connected to an information processing apparatus and operable to record information supplied from said information processing apparatus onto a record medium within said drive device, reproduce information from said record medium and output the reproduced information to said information processing apparatus, and re-execute a seek, record, or reproduce operation if an error occurs in the seek, record, or reproduce operation, said record medium drive device comprising:

control signal receiving means for receiving a control signal generated by and output from said information processing apparatus to control said re-execution; and re-execution control means for controlling said re-execution by controlling at least the maximum allowable number of re-executions in accordance with said control signal output from said information processing apparatus;

wherein said control signal output by said information processing apparatus contains a data field specifying the maximum allowable number of re-executions, and said re-execution control means controls the maximum allowable number of re-executions in accordance with data within said data field of said control signal.

15. A method of controlling a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said method comprising the steps of:

receiving a control signal generated by and output from said information processing apparatus to control said re-execution; and controlling said re-execution in accordance with said control signal output from said information processing apparatus, by controlling at least the maximum allowable number of re-executions in accordance with said control signal;

wherein said control signal output by said information processing apparatus contains a data field specifying the maximum allowable number of re-executions and the maximum allowable number of re-executions is controlled in said controlling step in accordance with data within said data field of said control signal.

16. A method of controlling a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said method comprising the steps of:

receiving a control signal generated by and output from said information processing apparatus to control said re-execution;

controlling said re-execution in accordance with said control signal output from said information processing apparatus; and transmitting to said information processing apparatus data representing a delay time caused by said re-execution.

17. A method of controlling a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said method comprising the steps of:

receiving a control signal generated by and output from said information processing apparatus to control said re-execution; and controlling said re-execution in accordance with said control signal output from said information processing apparatus, said controlling comprising selectively controlling the maximum allowable number of re-executions or the maximum period of time allowed for re-executions, wherein the maximum allowable number of seek re-executions is greater than the maximum allowable number of record or reproduce re-executions.

18. A method of controlling a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said method comprising the steps of:

receiving a control signal generated by and output from said information processing apparatus to control said re-execution; and controlling said re-execution in accordance with said control signal output from said information processing apparatus, said controlling comprising selectively controlling the maximum allowable number of re-executions or the maximum period of time allowed for re-executions, wherein the maximum period of time allowed for seek re-executions is greater than the maximum period of time allowed for record or reproduce re-executions.

19. A method of controlling a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said method comprising the steps of:

receiving a control signal generated by and output from said information processing apparatus to control said re-execution; and controlling said re-execution in accordance with said control signal output from said information processing apparatus, said controlling comprising selectively controlling the maximum allowable number of re-executions or the maximum period of time allowed for re-executions, wherein said maximum allowable number of re-executions or said maximum period of time allowed for re-executions dynamically varies during a respective seek, record, or reproduce operation.

20. A computer readable storage medium having stored thereon a computer readable program which controls a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said program controlling said record medium drive device to perform a process comprising the steps of:

receiving a control signal generated by and output from said information processing apparatus to control said re-execution;

controlling said re-execution in accordance with said control signal output from said information processing apparatus; and transmitting to said information processing apparatus data representing a delay time caused by said re-execution.

21. A computer readable storage medium having stored thereon a computer readable program which controls a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said program controlling said record medium drive device to perform a process comprising the steps of:

receiving a control signal generated by and output from said information processing apparatus to control said re-execution; and controlling said re-execution in accordance with said control signal output from said information processing apparatus, by controlling at least the maximum allowable number of re-executions in accordance with said control signal;

wherein said control signal output by said information processing apparatus contains a data field specifying the maximum allowable number of re-executions and the maximum allowable number of re-executions is controlled in said controlling step in accordance with data within said data field of said control signal.

22. A computer readable storage medium having stored thereon a computer readable program which controls a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said program controlling said record medium drive device to perform a process comprising the steps of:

receiving a control signal generated by and output from said information processing apparatus to control said re-execution;

controlling said re-execution in accordance with said control signal output from said information processing apparatus, said controlling comprising selectively controlling the maximum allowable number of re-executions or the maximum period of time allowed for re-executions, wherein the maximum allowable number of seek re-executions is greater than the maximum allowable number of record or reproduce re-executions.

23. A computer readable storage medium having stored thereon a computer readable program which controls a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said program controlling said record medium drive device to perform a process comprising the steps of:

receiving a control signal generated by and output from said information processing apparatus to control said re-execution;

controlling said re-execution in accordance with said control signal output from said information processing apparatus, said controlling comprising selectively controlling the maximum allowable number of re-executions or the maximum period of time allowed for re-executions, wherein the maximum period of time allowed for seek re-executions is greater than the maximum period of time allowed for record or reproduce re-executions.

24. A computer readable storage medium having stored thereon a computer readable program which controls a record medium drive device connected to an information processing apparatus and operable to record information supplied from said information processing apparatus onto a record medium within said drive device, reproduce said information from said record medium and output the reproduced information to said information processing apparatus, and re-execute a seek, record, or reproduce operation if an error occurs in the seek, record, or reproduce operation, said program controlling said record medium drive device to perform a process comprising the steps of:

receiving a control signal generated by and output from said information processing apparatus to control said re-execution;

controlling said re-execution in accordance with said control signal output from said information processing apparatus, said controlling comprising selectively controlling the maximum allowable number of re-executions or the maximum period of time allowed for re-executions, wherein said maximum allowable number of re-executions or said maximum period of time allowed for re-executions dynamically varies during a respective seek, record, or reproduce operation.

* * * * *